Patented Oct. 9, 1923.

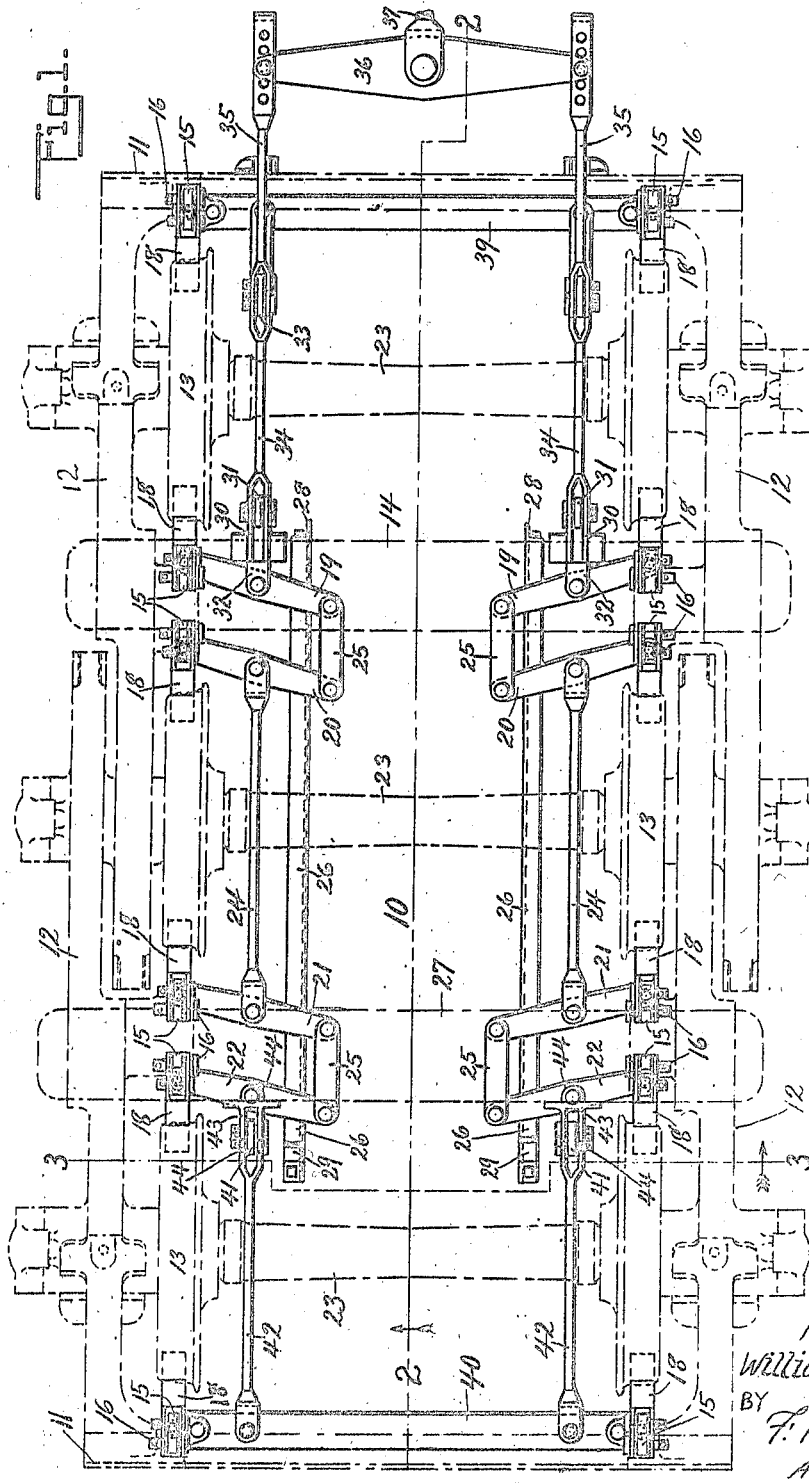

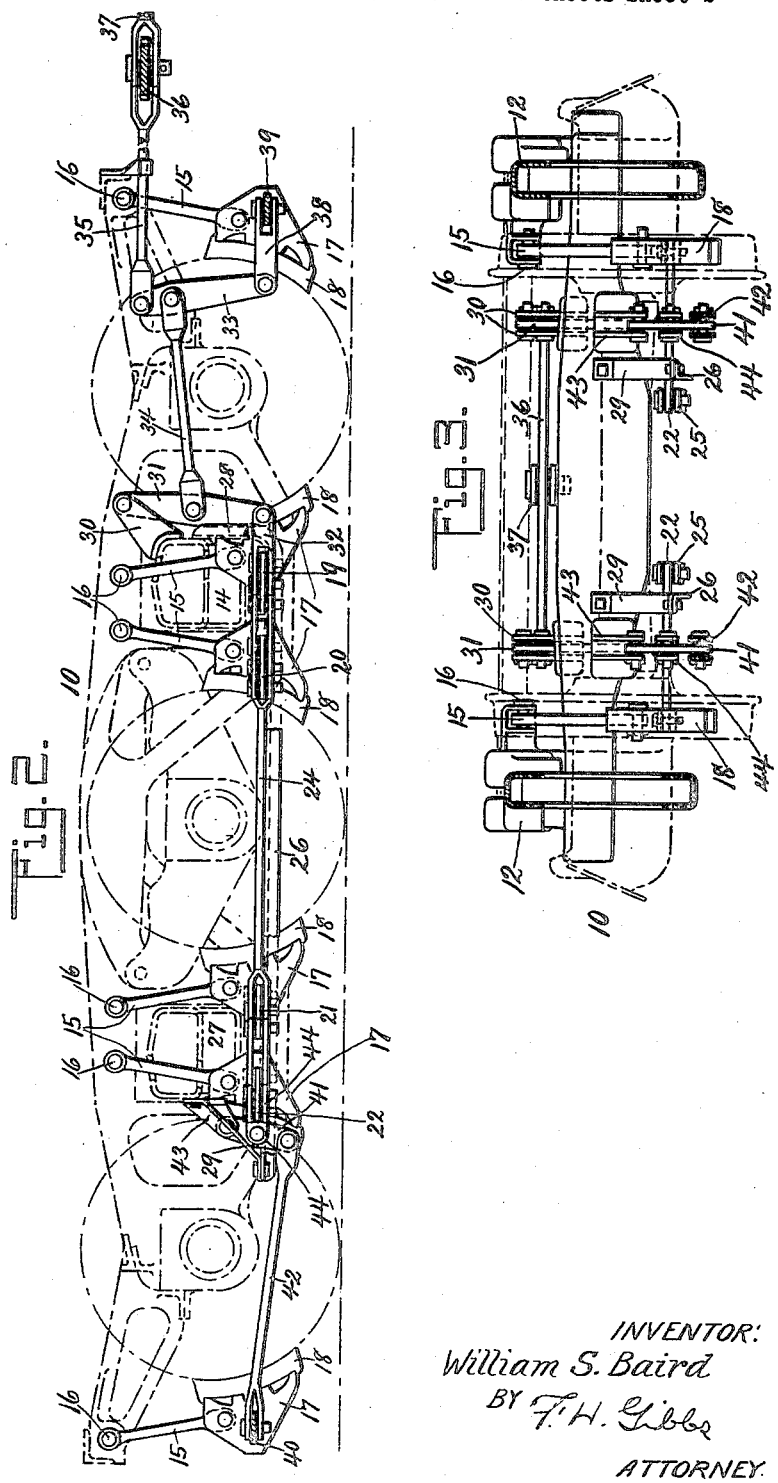

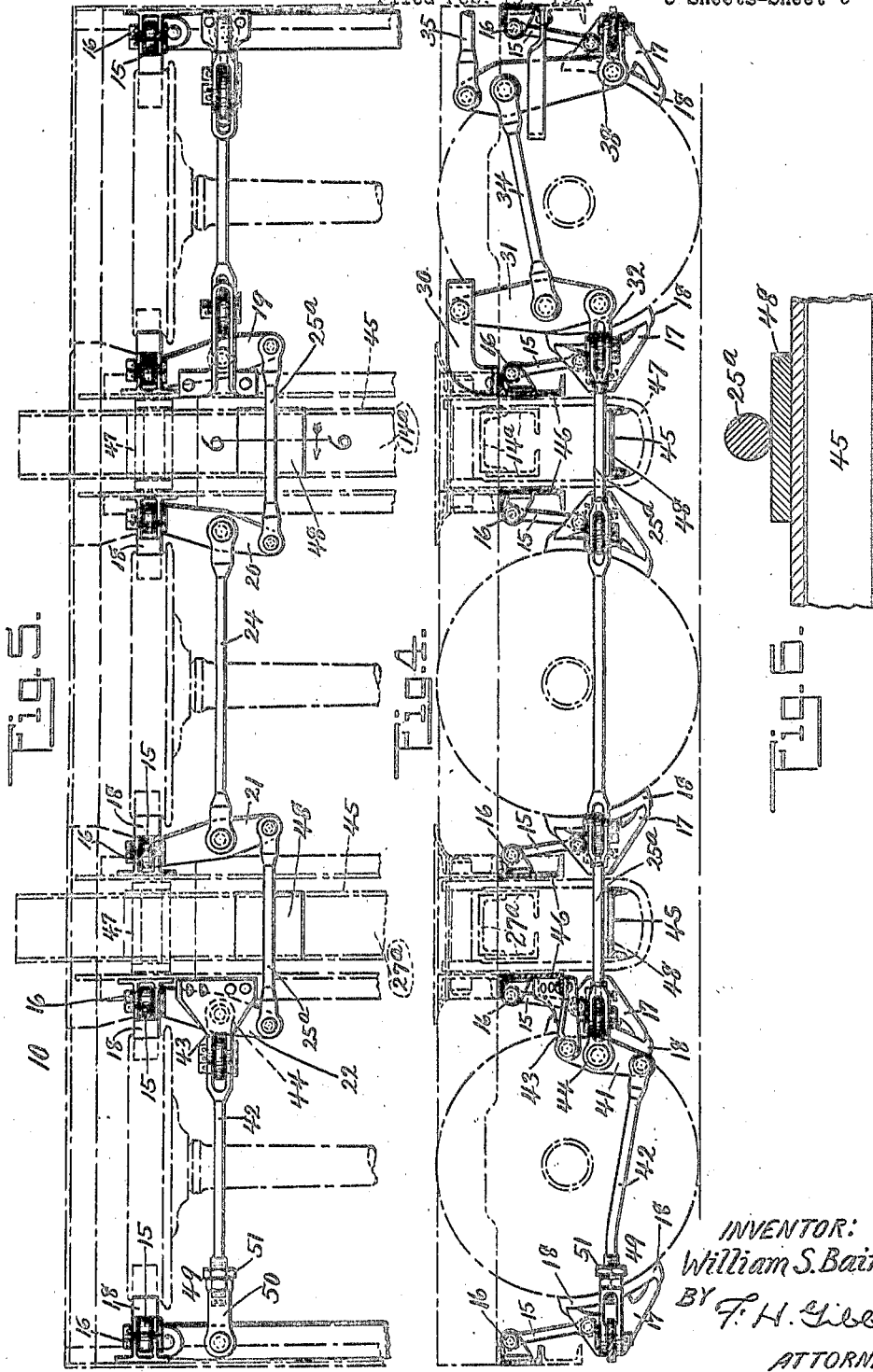

1,470,343

UNITED STATES PATENT OFFICE.

WILLIAM S. BAIRD, OF ELMHURST, NEW YORK, ASSIGNOR TO AMERICAN CAR AND FOUNDRY COMPANY, OF ST. LOUIS, MISSOURI, A CORPORATION OF NEW JERSEY.

CLASP-BRAKE RIGGING.

Application filed February 19, 1921. Serial No. 446,282.

*To all whom it may concern:*

Be it known that I, WILLIAM S. BAIRD, residing at Elmhurst, in the county of Queens and State of New York, and being a citizen of the United States, have invented certain new and useful Improvements in a Clasp-Brake Rigging, of which the following is a full, clear, and exact description, such as will enable others skilled in the art to which it appertains to make and use the same, reference being had to the accompanying drawings, which illustrate the preferred form of the invention, though it is to be understood that the invention is not limited to the exact details of construction shown and described, as it is obvious that various modifications thereof within the scope of the claims will occur to persons skilled in the art.

In said drawings:

Figure 1 is a plan view of my brake arrangement as applied to a 6-wheel freight car truck;

Figure 2 is an elevational view partly in section taken on line 2—2 of Fig. 1, looking in the direction indicated by the arrow;

Figure 3 is a transverse section through the truck taken on line 3—3 of Fig. 1, looking in the direction indicated by the arrow;

Figure 4 is a view similar to Fig. 2, showing the brake arrangement adapted to a passenger car truck;

Figure 5 is a plan view of the same; and

Figure 6 is a vertical section taken on line 6—6 of Fig. 5, showing a wear pad resting on the spring plank of the truck for supporting a lever connecting rod.

My invention relates to that class of brake apparatus in which the braking effort is applied to the opposite sides of each wheel of the truck.

One object of my invention is to provide a clasp brake apparatus in which the power from the brake cylinder is transmitted to pairs of connected primary levers arranged on opposite sides of the truck and adjacent one end thereof.

Another object is to transmit the power received by the primary levers to the truck wheels through the medium of brake shoe actuating levers arranged in pairs between the axles and connected with brake beams at the outer sides of the end pairs of wheels.

A further object is to provide a supplementary lever connection between the brake shoe levers and an adjacent brake beam for equalizing the pressure of the shoes carried thereby.

In said drawings, 10 designates in broken lines a 6-wheel truck comprising the usual truck frame having the customary end sills 11 and wheel pieces 12 and mounted upon three pairs of wheels 13 spaced apart to receive bolsters 14 and 27 supported on the wheel pieces.

The brake parts are suspended from the truck frame by means of hangers 15 pivotally secured to the truck frame as at 16 and supporting at their lower ends the usual brake heads 17 in the plane of the wheels. The brake heads 17 are fitted with brake shoes 18 in position to bear against the truck wheels under the influence of pressure applied by means of the brake parts hereinafter described.

Pivotally secured to their respective brake heads 17 are substantially horizontal brake levers 19, 20, 21 and 22, arranged in pairs between the axles 23 and on opposite sides of the truck. Said brake levers extend inwardly from their respective heads and are connected at their intermediate portions and inner ends respectively by connections 24 and 25 adapted to transmit power and motion from one lever to the others in the same series, said levers and connections operating as a unit in transmitting braking power from one end of the truck to the other.

Suitable supports 26 for the levers are provided adjacent their inner ends to serve as guides for maintaining at all times a proper operating relation between said levers and the brake shoes. These guides may be in the form of angle irons as shown in the drawings, or of any other desired section, and secured to a convenient truck part, preferably the bolsters 14 and 27 as shown in Figs. 1, 2, and 3 of the drawings. The guides in the present embodiment of the invention terminate at one end in upstanding portions 28 adapted to be secured to the bolster 14 and having their other ends extended past another bolster 27 and held by brackets 29 secured at their terminals to guides 26 and said bolsters.

The brake levers 19, 20, 21 and 22 are preferably arranged in substantial parallelism and initially positioned at an angle to the plane of the truck wheels and directed toward one end of the truck to avoid excessive angularity thereof in the opposite direction upon application of the brakes. To provide sufficient clearance for the movement of brake lever 22 the guide end adjacent thereto is extended past the bolster and supported by brackets 29 as above pointed out. Should the range of movement of brake lever 19 tend to interfere with the upstanding guide portions 28 at bolster 14, said upstanding portions may be turned down and the guides supported as at their opposite ends.

Supported on the truck bolster 14 are fulcrum brackets 30 pivotally carrying primary dead levers 31 connected to brake levers 19 by couplings 32 secured to the intermediate portions of brake levers 19 and the lower ends of primary dead levers 31. The primary dead levers are connected to primary live levers 33 by pull rods 34 secured to intermediate portions of said levers. The primary levers are positioned on opposite sides of the truck and connected to the source of power by pull rods 35 secured to the upper ends of the primary live levers and to the ends of a floating equalizing lever 36 connected by power rod 37 to the brake cylinder (not shown).

Secured to the lower ends of live levers 33 are couplings 38 connecting said levers with brake beam 39 at that end of the truck. The primary live levers are proportioned to equalize the pull on couplings 38 so that the brake shoe pressure on opposite sides of the adjacent pair of wheels will be uniform. At the opposite end of the truck is a similar brake beam 40 connected to equalizing arms 41 by means of pull rods 42 secured to the lower ends of said equalizing arms. The equalizing arms are fulcrumed at their upper ends to brackets 43 secured to adjacent bolster 27 and connected to brake levers 22 by couplings 44, and are so proportioned relatively to the brake levers that a pull on brake beam 40 will cause the shoes carried thereon to bear against the outer side of the end pair of wheels with a pressure corresponding to that exerted by the shoes carried by the brake levers.

It may be desirable to apply the arrangement to a passenger train car truck, as shown in Figs. 4, 5 and 6. Such truck is indicated as having the usual swing bolsters 14ª and 27ª supported upon spring planks 45 hung from the transoms 46 of the truck by means of suspension links 47 pivotally mounted on said transoms as indicated in broken lines in Figs. 4 and 5. For such trucks the arrangement is modified to dispense with the guides 26 for supporting the inner ends of the brake levers 19, 20, 21 and 22, that function being performed by means of the spring planks 45. These spring planks are provided with wearing pads 48 of any suitable material, preferably wood or the like, upon which the brake lever connections 25ª are adapted to rest and support the inner ends of the adjacent brake levers.

To take up the slack in the brake parts upon wearing down of the brake shoes, take-up devices 49 of any approved form may be mounted at any desired point between the brake beams, preferably as shown in Figs. 4 and 5. The preferred form of take-up mechanism comprises the jaw 50 threaded upon pull rod 42 with suitable jam nuts 51 or the like, to prevent chattering of the parts.

In the operation of my device the power is applied to the equalizing lever 36 by the power rod 37 and transmitted through rod 35 to the levers 33 engaging the shoes 18 mounted on beam 39 with the adjacent wheels. With the shoes on beam 39 in engagement with the wheels, power is applied through rods 34 to levers 31 operating the levers 19, 20, 21 and 22 through their connections 24 and 25 to bring the brake shoes operated by these levers to the wheels and operating the levers 41 which act through operating rods 42 to bring the shoes on beam 40 to the adjacent wheels.

What I claim is:

1. In a brake-rigging for six-wheeled trucks, the combination with brake shoes applied to both sides of each pair of wheels, of brake beams connecting certain of said brake shoes, brake levers extending inwardly from the other of said brake shoes and arranged in pairs between the wheels, and levers between said brake beams and brake levers.

2. In a brake-rigging for six-wheeled trucks, the combination with brake shoes applied to both sides of each pair of wheels, of brake beams connecting the shoes on the outer sides of the end pairs of wheels, primary live levers at one brake beam, brake levers extending inwardly from other of said brake shoes and arranged in pairs between the wheels and connected in series, said levers operating as a unit in transmitting power from the live levers at one brake beam to the other brake beam.

3. In a brake-rigging for six-wheeled trucks, the combination with brake shoes applied to both sides of each wheel, of a series of horizontal brake levers extending inwardly from certain of said shoes, brake beams arranged on the outer sides of the end pairs of wheels, and vertically arranged levers connecting said brake levers and brake beams.

4. In a clasp brake-rigging for six-wheeled trucks, the combination comprising brake shoes applied to both sides of each wheel, of brake levers extending inwardly from certain of said shoes and arranged in pairs between the wheels and connected in series on each side of the truck, vertically arranged levers at one end of said series of levers, primary levers on the opposite end thereof, and brake beams on the outer sides of the end pairs of wheels connected with said vertically arranged levers and said primary levers.

5. In a brake-rigging for six-wheeled trucks having brake beams on the outer sides of the end pairs of wheels only, the combination with brake shoes applied to both sides of each wheel, of brake levers extending inwardly from certain of said shoes and arranged in pairs between said wheels and links extending from lever to lever connecting said levers, said levers operating as a unit in transmitting power from one brake beam to the other.

6. In a brake-rigging for six-wheeled trucks, the combination with brake shoes applied to both sides of each wheel, of brake levers secured at one end to certain of said brake shoes and extending inwardly therefrom and connected in series, brake beams connecting the brake shoes on the outer sides of the end pairs of wheels, and levers between the brake beams and said brake levers.

7. In a brake-rigging for six-wheeled trucks, the combination with brake shoes applied to both sides of each wheel, of brake levers secured at one end to certain of said brake shoes and extending inwardly therefrom and connected in series, brake beams connecting the shoes on the outer sides of the end pairs of wheels, primary levers connecting said series of brake levers to one of said brake beams, and supplementary levers connecting said series of brake levers to the other of said brake beams.

8. In a brake-rigging for six-wheeled trucks, the combination with brake shoes applied to both sides of each wheel, of brake beams connecting the shoes on the outer sides of the end pairs of wheels, brake levers extending inwardly from other of said brake shoes and connected in series, supplementary levers connecting said series of brake levers with one of said brake beams, pairs of primary levers connecting said series of brake levers with the other of said brake beams, and a floating equalizing lever connecting said primary levers.

9. In a brake rigging for six-wheeled trucks, the combination with brake shoes applied to both sides of each wheel, of brake beams connecting the outer shoes of the end pairs of wheels, series of connected levers projecting inwardly from the other shoes, primary levers connected to one of said beams, primary levers connected to said series of levers and the other primary levers and vertically arranged levers connected to said series of levers and the other brake beam.

10. In a brake rigging for six-wheeled trucks, the combination with brake shoes applied to both sides of each wheel, of brake beams connecting the outer shoes of the end pairs of wheels, series of horizontal levers connected to the other shoes, primary levers connected to one of said brake beams and ends of said series of levers and vertically arranged levers connected to the other brake beam and the other ends of said series of levers.

In witness whereof I have hereunto set my hand in the presence of two witnesses.

WILLIAM S. BAIRD.

Witnesses:
James D. Anderson.
John Beyer.